US006301651B1

(12) United States Patent
Chang et al.

(10) Patent No.: US 6,301,651 B1
(45) Date of Patent: Oct. 9, 2001

(54) METHOD AND APPARATUS FOR FOLDING A PLURALITY OF INSTRUCTIONS

(75) Inventors: Lung-Chung Chang, Hsin-Chu; Lee-Ren Ton, Tainan; Min-Fu Kao, Taipei; Chung-Ping Chung, Hsin-Chu, all of (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 09/340,405

(22) Filed: Jun. 28, 1999

(30) Foreign Application Priority Data

Dec. 29, 1998 (TW) ................................................. 87121769

(51) Int. Cl.[7] ........................... G06F 12/08; G06F 9/312; G06F 9/24; G06F 9/40; G06F 9/445
(52) U.S. Cl. ........................ 712/202; 712/200; 712/217; 712/228; 712/248; 712/231; 711/110; 711/125; 711/132
(58) Field of Search ..................... 712/217, 23, 200, 712/212, 202, 231, 223, 225, 227, 228, 237, 208, 213, 248, 226, 209, 26, 27, 210; 711/165, 110, 6, 118, 200, 132, 125

(56) References Cited

U.S. PATENT DOCUMENTS 6,125,439 * 9/2000 Tremblay et al. .................. 712/202
6,148,391 * 11/2000 Petrick ................................. 712/202
6,237,086 * 5/2001 Koppala et al. ..................... 712/226

OTHER PUBLICATIONS

Bulman, D.M. "Stack Computers: An Introduction", IEEE Computer Magazine, vol. 10, No. 5, May 1997, pp. 18–28.

Harold S. Stone, "High–Performance Computer Architecture", Addison–Wesley Publishing Company, 1987, pp. 102–115.

* cited by examiner

Primary Examiner—Daniel H. Pan
(74) Attorney, Agent, or Firm—Winston Hsu

(57) ABSTRACT

The present invention provides a stack machine for executing a plurality of instructions one by one. The stack machine comprises an operation folder and an execution unit. The operation folder is used for checking if one or more instructions of a predetermined number of instructions following a specific instruction in a predetermined sequence can be folded with the specific instruction according to a POC folding rule. If they are foldable, these instructions will be combined to form a new instruction. The execution unit is used for executing instructions which cannot be folded by the operation folder or new instructions generated by the operation folder one by one. The instructions are folded to enhance operation efficiency of the stack machine.

13 Claims, 10 Drawing Sheets

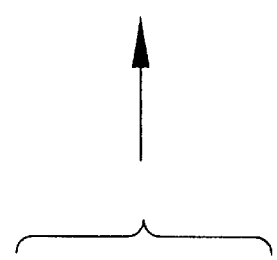

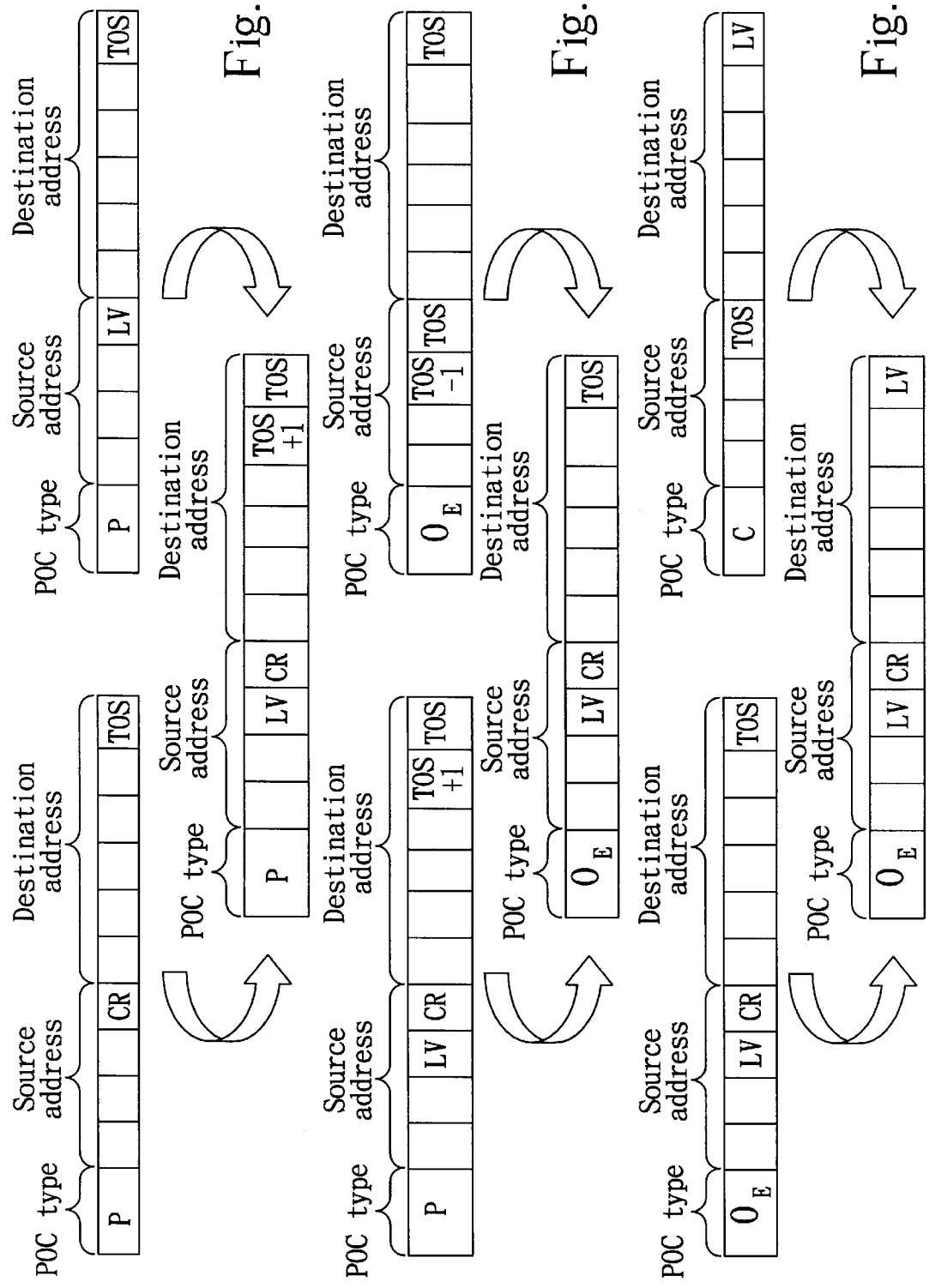

METHOD AND APPARATUS FOR FOLDING A PLURALITY OF INSTRUCTIONS

BACKGROUND OF THE INVENTION

1. Field of the Invention

The invention relates to a stack machine, and more particularly, to a method and apparatus for folding a plurality of instructions.

2. Description of the related Art

Please refer to FIG. 1. FIG. 1 is a functional block diagram of a stack machine 10. The prior art of a stack machine is disclosed in Bulman, D. M., "Stack Computers: An Introduction," IEEE Computer, Vol. 10, No. 5, May 1977, p. 18~28. The prior art of a pipeline machine is disclosed in Harold S. Stone, "High-Performance Computer Architecture," Addison-Wesley Publishing Company, 1987, p.102~115. We can learn from the related art of the above materials that the modern stack machine 10 could comprise:

- an instruction cache 41 for storing a plurality of instructions,
- an instruction ring buffer 42 for storing a predetermined number of the instructions,
- an operation code checker (sizer) 44 for determining the size of each instruction in the instruction ring buffer 42 based on an operation code, and obtaining indicators of the operation code and operands of the instruction for identifying the operation code and the operands such that indicators of operation codes are 1 and that of operands are 0,
- a program controller 60 for controlling access or shift of the instructions stored in the instruction cache 41 or the instruction ring buffer 42 according to the indicators of the instructions generated in the operation code checker 44,
- a decoder 52 for decoding each of the operation codes according to its instruction format, and outputting a control signal 109 for providing an execution unit 54 with an executable function such as addition, subtraction, multiplication, division and shifting,
- an address generation unit 55 for generating a source address 105 and a destination address 107, an executable instruction buffer 58 for storing the source address 105, the destination address 107, and the control signal 109, and
- an execution unit 54 for receiving the control signal 109, source address 105 and destination address 107 from the executable instruction buffer 58, and executing the control signal 109 such as addition, subtraction, multiplication, division and shifting by reading and storing data through a local variable register 18, operand stack 12 or constant register 16 according to the source and destination addresses 105, 107.

Please refer to FIG. 2. FIG. 2 is an operation flow of the stack machine 10. Instructions can be classified into three basic types by the viewpoint of the present invention. They are producer (P) 14, operator (O) 20, and consumer (C) 22. Assuming three instructions in the sequence of type P, O, C are to be executed and the instruction of type O has to be stored into the operand stack 12 after execution, operations of the three instructions are as follows:

Step 1: accessing data from a source such as the constant register 16 or local variable register 18 and storing it to top of the operand stack (TOS) 12 according to the producer 14 because data are accessed through the operand stack 12 in a first in last out manner;

Step 2: reading the data from the top of the operand stack 12 (TOS);

Step 3: having the execution unit 54 use the operator 20 to execute the data to obtain an executed data;

Step 4: storing the executed data to the top of the operand stack (TOS) 12;

Step 5: accessing the executed data from the top of the stack (TOS) 12 and storing it to the local variable register 18 according to the consumer 22.

The above steps show that data have to be accessed through the operand stack 12. This is called data dependency and it causes the waste of operation time.

A related art method of speeding up operations of instructions is disclosed in U.S. Pat. No. 5,214,763. This method utilizes a super scalar technique to perform operations of instructions by using a plurality of function units. Although the instructions are operated at the same time, the problem of data dependency still persists. Moreover, the use of the function units will make operations of the instructions very complicated.

SUMMARY OF THE INVENTION

It is therefore a primary objective of the present invention to provide a method and an apparatus for folding a plurality of instructions to solve the above mentioned problems.

The apparatus comprises a folding instruction buffer, an operation folder, a folding length checker, a temporary folded instruction buffer, a source address generation unit, and a destination address generation unit.

The folding instruction buffer is used for storing operation codes, operands and their indicators of a predetermined number of instructions to be folded, the indicators are used for identifying the operation codes and the operands such that indicators of operation codes are 1 and that of operands are 0.

The operation folder is used for receiving the operation codes of the instructions, and checking if two consecutive instructions are foldable according to a POC folding rule and a position storage rule by checking if a destination of a preceding instruction and a source of a following instruction are the same, and a destination data length of the preceding instruction and a source data length of the following instruction are the same. If the two consecutive instructions are not foldable, the operation folder will output the operation code, source and destination of the preceding instruction. If the two consecutive instructions are foldable, the operation folder will check POC types of the two instructions according to the POC folding rule so as to generate a folding number signal. The operation folder will also generate a source and a destination of a combined temporary command according to the position storage rule, and select a primary operation code according to the POC types of the instructions and the folding number signal.

The folding length checker is used for receiving the indicators of the operation codes and operands corresponding to the instructions in the folding instruction buffer, and checking the folding number signal transmitted from the operation folder for the number of foldable instructions.

The temporary folded instruction buffer is used for receiving a source, a destination, operands corresponding to the operation codes, and a primary operation code of a folded instruction from the operation folder.

The source address generation unit is used for receiving the source from the temporary folded instruction buffer and a base address corresponding to the source. If the instructions contain operands corresponding to their operation codes, operands corresponding to the source will be combined to form a source address.

The destination address generation unit is used for receiving the destination from the temporary folded instruction buffer and a base address corresponding to the destination. If the instructions contain operands corresponding to their operation codes, operands corresponding to the destination will be combined to form a destination address.

It is an advantage of the present invention that the apparatus can fold a plurality of instructions for enhancing operation efficiency of a stack machine.

These and other objects and the advantages of the present invention will no doubt become obvious to those of ordinary skill in the art after having read the following detailed description of the preferred embodiment that is illustrated in the various FIGS. and drawings.

BRIEF DESCRIPTION OF THE DRAWINGS

FIG. 5 shows transformations of four consecutive instructions.

FIG. 6 shows a folding operation of the four instructions in FIG. 5 according to a POC folding rule.

FIGS. 7A to 7C show steps of performing the folding operation in FIG. 6.

DETAILED DESCRIPTION OF THE PREFERRED EMBODIMENT

Figure 3:
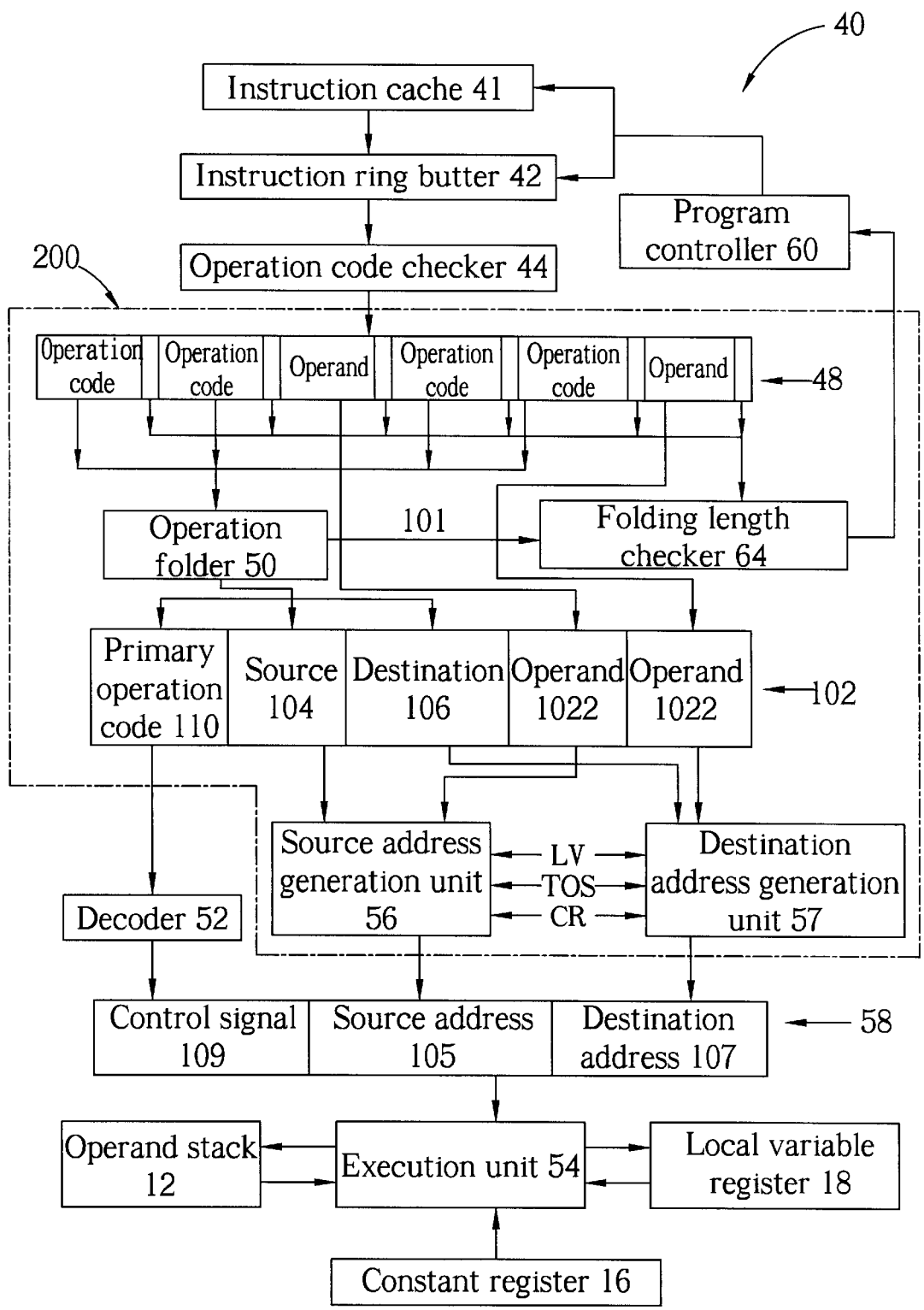
FIG. 3 is a functional block diagram of a stack machine according to the present invention.

Please refer to FIG. 3. FIG. 3 is a functional block diagram of a stack machine 40 according to the present invention. The stack machine 40 comprises an instruction cache 41, an instruction ring buffer 42, an operation code checker 44, an operation folding device 200, a program controller 60, a decoder 52, an executable instruction buffer 58, an execution unit 54, a local variable register 18, an operand stack 12, and a constant register 16.

The operation folding device 200 is positioned between the operation code checker 44 and the executable instruction buffer 58 for folding a predetermined number of instructions. Before the execution unit 54 executes the instructions, the operation folding device 200 checks foldability of the instructions according to a POC folding rule and a position storage rule to find foldable instructions for saving operation time.

The operation folding device 200 comprises a folding instruction buffer 48, an operation folder 50, a folding length checker 64, a temporary folded instruction buffer 102, a source address generation unit 56 and a destination address generation unit 57.

The folding instruction buffer 48 is used for storing operation codes and operands of the instructions transmitted from the operation code checker 44.

The operation folder 50 is used for receiving the operation codes of the instructions from the folding instruction buffer 48, checking if two consecutive instructions are foldable by checking if their POC types are foldable according to the POC folding rule, a destination of a preceding instruction and a source of a following instruction are the same, and a destination data length of the preceding instruction and a source data length of the following instruction are the same according to the position storage rule, and generating a folding number signal 101, a combined source 104, a combined destination 106, and a primary operation code 110 if necessary.

The folding length checker 64 is used for receiving indicators of the operation codes and operands for identifying the operation codes and operands, such that 1 for operation codes and 0 for operands, corresponding to the instructions in the folding instruction buffer 48, and checking the folding number signal 101 for the number of foldable instructions so as to use the program controller 60 to control access or shift of the instructions stored in the instruction cache 41 or instruction ring buffer 42.

The temporary folded instruction buffer 102 is used for receiving a primary operation code 110, a source 104, and a destination 106 of a folded instruction from the operation folder 50, and the operands 1022 corresponding to the folding instruction buffer 48.

The source address generation unit 56 is used for receiving the source 104 from the temporary folded instruction buffer 102 and a base address corresponding to the source 104 wherein if the instructions contain operands 1022 corresponding to their operation codes, operands 1022, which indicate offset of the base address, corresponding to the source 104 will be combined to form a source address 105.

The destination address generation unit 57 is used for receiving the destination 106 from the temporary folded instruction buffer 102 and a base address corresponding to the destination 106 wherein if the instructions contain operands 1022 corresponding to their operation codes, operands 1022 corresponding to the destination 106 will be combined to form a destination address 107.

Please refer to Table 1.

TABLE 1

| δ | Command N+1 | | | | | | |
|---|---|---|---|---|---|---|---|
| | $P_{S2,W2/TOS,W2'}$ | $O_{E/TOS,W2/TOS,W2'}$ | $O_{B/TOS,W2/-,-}$ | $O_{TOS,W2/TOS,W2'}$ | | | |
| | | | | $O_{C/TOS,W2/TOS,W2'}$ | $O_{T/-,-/-,-}$ | $C_{TOS,W2/LV,W2'}$ |
| Command N | | | | | | | |
| $P_{S1,W1/TOS,W1'}$ | $P_{S1+S2,W1+W2/TOS,W1'+W2'}$/SI/C | $O_{E/S1,W2/TOS,W2'}$/FI/C | $O_{B/S1,W2/-,-}$/FI/E | $O_{C/S1,W2/TOS,W2'}$/FI/C | $P_{S1,W1/TOS,W1'}$/SI/E | $C_{S1,W2/LV,W2'}$/SI/E |
| $O_{S1,W1/D1,W1'}$ | | | | | | |
| $O_{E/S1,W1/D1,W1'}$ | $O_{E/S1,W1/D1,W1'}$/SI/E | $O_{E/S1,W1/D1,W1'}$/SI/E | $O_{E/S1,W1/D1,W1'}$/SI/E | $O_{E/S1,W1/D1,W1'}$/SI/E | $O_{E/S1,W1/D1,W1'}$/SI/E | $O_{E/S1,W1/LV,W2'}$/FI/C |
| $O_{B/S1,W1/-,-}$ | $O_{B/S1,W1/-,-}$/SI/E | $O_{B/S1,W1/-,-}$/SI/E | $O_{B/S1,W1/-,-}$/SI/E | $O_{B/S1,W1/-,-}$/SI/E | $O_{B/S1,W1/-,-}$/SI/E | $O_{B/S1,W1/-,-}$/SI/E |
| $O_{C/S1,W1/D1,W1'}$ | $O_{C/S1,W1/D1,W1'}$/SI/E | $O_{C/S1,W1/D1,W1'}$/SI/E | $O_{C/S1,W1/D1,W1'}$/SI/E | $O_{C/S1,W1/D1,W1'}$/SI/E | $O_{C/S1,W1/D1,W1'}$/SI/E | $O_{C/S1,W1/LV,W2'}$/FI/C |
| $O_{T/-,-/-,-}$ | $O_{T/-,-/-,-}$/SI/E | $O_{T/-,-/-,-}$/SI/E | $O_{T/-,-/-,-}$/SI/E | $O_{T/-,-/-,-}$/SI/E | $O_{T/-,-/-,-}$/SI/E | $O_{T/-,-/-,-}$/SI/E |
| $C_{TOS,W1/LV,W1'}$ | $C_{TOS,W1/LV,W1'}$/SI/E | $C_{TOS,W1/LV,W1'}$/SI/E | $C_{TOS,W1/LV,W1'}$/SI/E | $C_{TOS,W1/LV,W1'}$/SI/E | $C_{TOS,W1/LV,W1'}$/SI/E | $C_{TOS,W1/LV,W1'}$/SI/E |

Table 1 shows the POC folding rule. The symbols in Table 1 are defined as follows:

P (producer): instructions such as a load instruction which accesses an operand from a constant register or a local variable register and stores the operand in the operand stack 12;

O (operator): instructions which access operands in the operand stack 12 and pass the operands to the execution unit 54 for executions, operators can be further categorized as follows:

$O_E$: arithmetic and logic instructions such as an addition, subtraction, multiplication or division instruction which accesses an operand in the operand stack 12, passes the operand to the execution unit 54 for executions, and stores an executed result to the operand stack 12;

$O_B$: conditional instructions such as an if instruction which accesses an operand from the operand stack, passes the operand to the execution unit 54 for executions, and jumps to a target address according to the executed result;

$O_C$: complex instructions such as an array access instruction which accesses a complicated operand from the operand stack 12, passes the complicated operand to the execution unit 54 for executions, and stores the executed result to the operand stack 12; and $O_T$: termination instructions such as a jump instruction which accesses an operand from the operand stack 12, and passes the operand to the execution unit 54 for executions, the termination instructions cannot be folded with other instructions;

C (consumer): instructions such as a save instruction which accesses operands from the operand stack 12, and stores the operands to the local variable register 18;

□: folding operator of instructions N and N+1;

Sn: source such as the local variable register 18, operand stack 12 or constant register 16;

Wn: length of source;

Dn: destination such as the local variable register 18 or operand stack 12;

Wn': length of destination;

$P_{Sn,Wn/TOS,Wn'}$: producer (P) which reads data of length Wn from the source Sn, and stores data of length Wn' in the top of the operand stack 12 (TOS);

$O_{E/Sn,Wn/Dn,Wn'}$: operator ($O_E$) which reads data of length Wn from the source Sn, and stores data of length Wn' in the destination Dn;

$C_{TOS,Wn/LV,Wn'}$: consumer (C) which reads data of length Wn from the top of the operand stack 12 (TOS), and stores data of length Wn' in the local variable register 18 (LV).

Folding operations performed on two consecutive instructions N, N+1 will generate a temporary instruction in one of following two statuses:

SI: the instructions N, N+1 can be accumulated, but are not foldable;

FI: the instructions N, N+1 are foldable.

The temporary instruction generated by folding the instructions N, N+1 will be in one of following two states:

C: the temporary instruction can be used to check its foldability with a following instruction;

E: the temporary instruction can not be folded with the following instruction.

For example, folding operation performed on a producer $P_{S1,W1/TOS,W1'}$ and an operator $O_{E/TOS,W2/TOS,W2'}$ will generate a temporary operator $O_{E/S1,W2/TOS,W2'}$/FI/C. The source of the temporary operator is S1, the length of the source is W2, the destination is TOS, the length of the destination is W2'. FI shows that the producer $P_{S1,W1/TOS,W1'}$ and the operator $O_{E/TOS,W2/TOS,W2'}$ are foldable. C shows that the temporary operator $O_{E/S1,W2/TOS,W2'}$ can be used to check its foldability with a following instruction. As described above, the destination (TOS) and the length of the destination (W1') of the producer $P_{S1,W1/TOS,W1'}$ have to be the same as the source (TOS) and the length of the source (W2) of the operator $O_{E/TOS,W2/TOS,W2'}$ for performing the folding operation.

Figure 4:
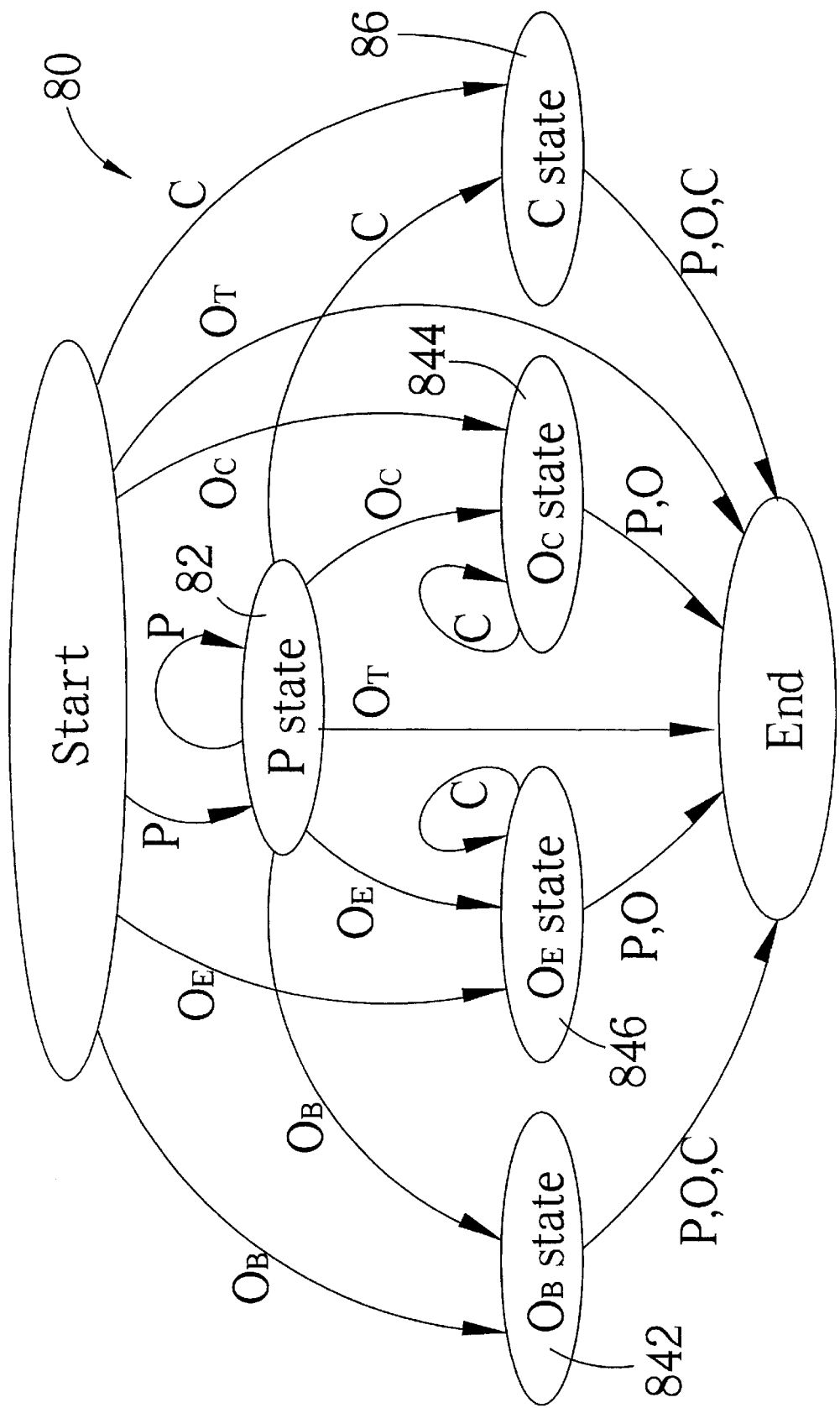
FIG. 4 shows a state diagram of the POC folding rule.

Please refer to FIG. 4. FIG. 4 shows a state diagram of the POC folding rule. The stack machine 40 can be in P state 82, O ($O_B$, $O_C$, $O_E$) state 842, 844, 846 or C state 86.

When the POC type of a first instruction is producer P, the stack machine 40 will enter P state 82. If following instructions are also producers, the stack machine 40 will remain in P state 82 and accumulate the instructions so as to generate a source for a following operator or consumer.

In P state 82, if a following instruction is an operator ($O_B$, $O_C$, $O_E$) or a consumer (C), the stack machine 40 will enter $O_B$, $O_C$, $O_E$ state 842, 844, 846 or C state 86.

In $O_C$, $O_E$ state 844, 846, if a following instruction is a consumer, the stack machine 40 will remain in $O_C$, $O_E$ state 844, 846, but the destination of a generated temporary instruction will be changed. If the following instruction is a producer or an operator, the folding operation of the stack machine 40 will be terminated.

In $O_B$ state 842 or C state 86, the folding operation of the stack machine 40 will be ended regardless of the POC type of a following instruction.

The folding operation of the stack machine 40 will be terminated as long as the POC type of a following instruction is an operator ($O_T$).

Please refer to FIG. 5 to FIG. 7C. FIG. 5 shows transformations of four consecutive instructions I1, I2, I3 and I4. FIG. 6 shows a folding operation of the four instructions I1, I2, I3 and I4 according to the POC folding rule in Table 1. FIGS. 7A to 7C show steps of performing the folding operation in FIG. 6.

In the first folding step of the folding operation, producers $P_{iconst\_2,1/TOS,1}$ and $P_{LV1,1/TOS,1}$ can be accumulated but are not foldable (SI), they are merged to form a producer $P_{iconst\_2+LV1,2/TOS,2}$/SI/C which can be checked for further foldability.

In the second folding step, the producer $P_{iconst\_2+LV1,2/TOS,2}$ and an operator $O_{E/TOS,2/TOS,1}$ are folded to form an arithmetic operator $O_{E/iconst\_2+LV1,2/TOS,1}$/FI/C. The arithmetic operator can be checked for further foldability, and the source address of the operator is changed to iconst_2 and LV1.

In the final folding step, the arithmetic operator $O_{E/iconst\_2+LV1,2/TOS,1}$ and a consumer $C_{TOS,1/LV2,1}$ are folded to form an operator $O_{E/iconst\_2+LV1,2/LV2,1}$/FI/E which is no longer foldable.

The folding operation performed folds the four instructions I1 to I4 into one combined instruction with two sources iconst_2 and LV1 and one destination LV2.

Figure 8:
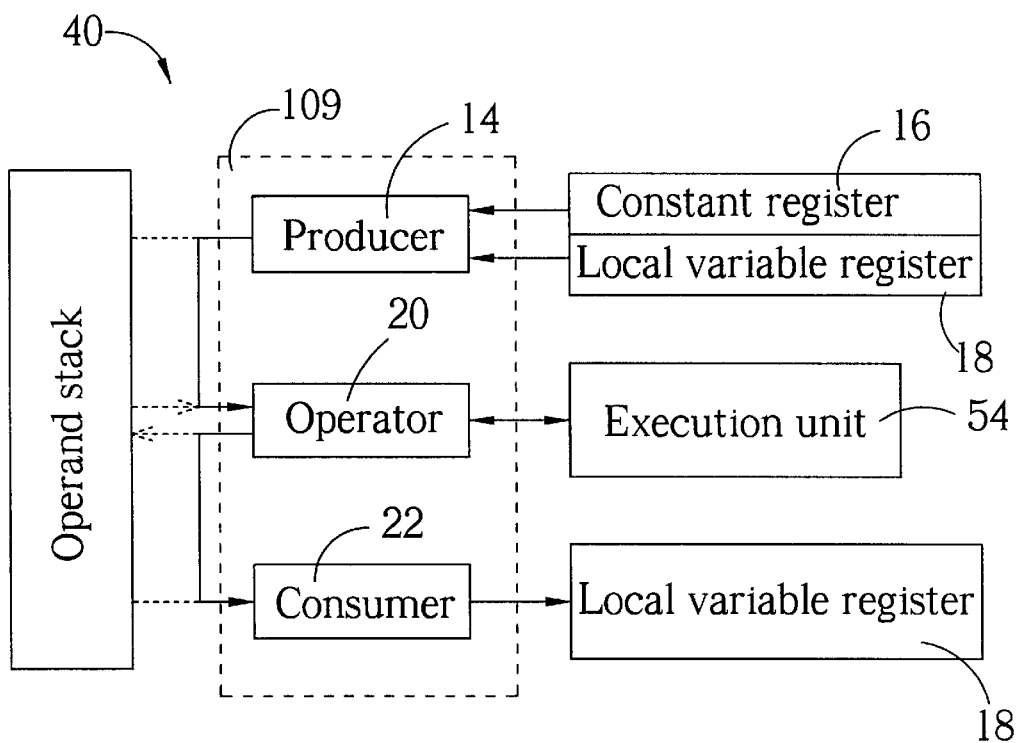
FIG. 8 is an operation flow of the stack machine in FIG. 3.

Please refer to FIG. 8. FIG. 8 is operation flow of the stack machine 40 in FIG. 3. The stack machine 40 has the same structure as the stack machine 10. However, operation performed in the stack machine 40 has been simplified to the following three steps:

Step 1: folding the producer (P) 14 and the operator (O) 20 for allowing the operator 20 to access data directly from the constant register 16 or the local variable register 18;

Step 2: passing the accessed data to the execution unit 54 for execution;

Step 3: folding the operator 20 and the consumer (C) 22 for allowing the consumer 22 to access executed data directly from the execution unit 54 and store the executed data to the local variable register 18.

Figure 1:
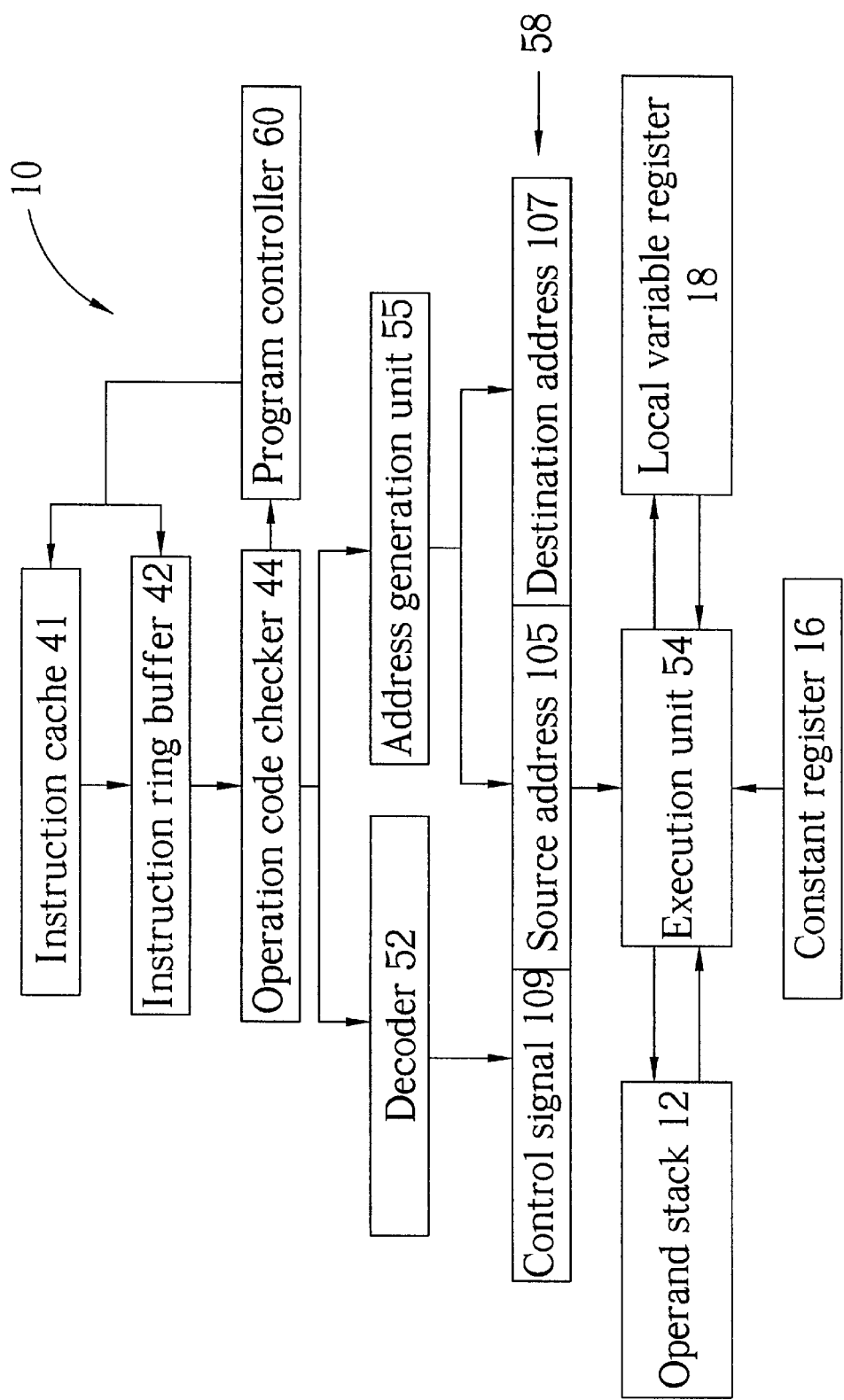
FIG. 1 is a functional block diagram of a stack machine.
Figure 2:
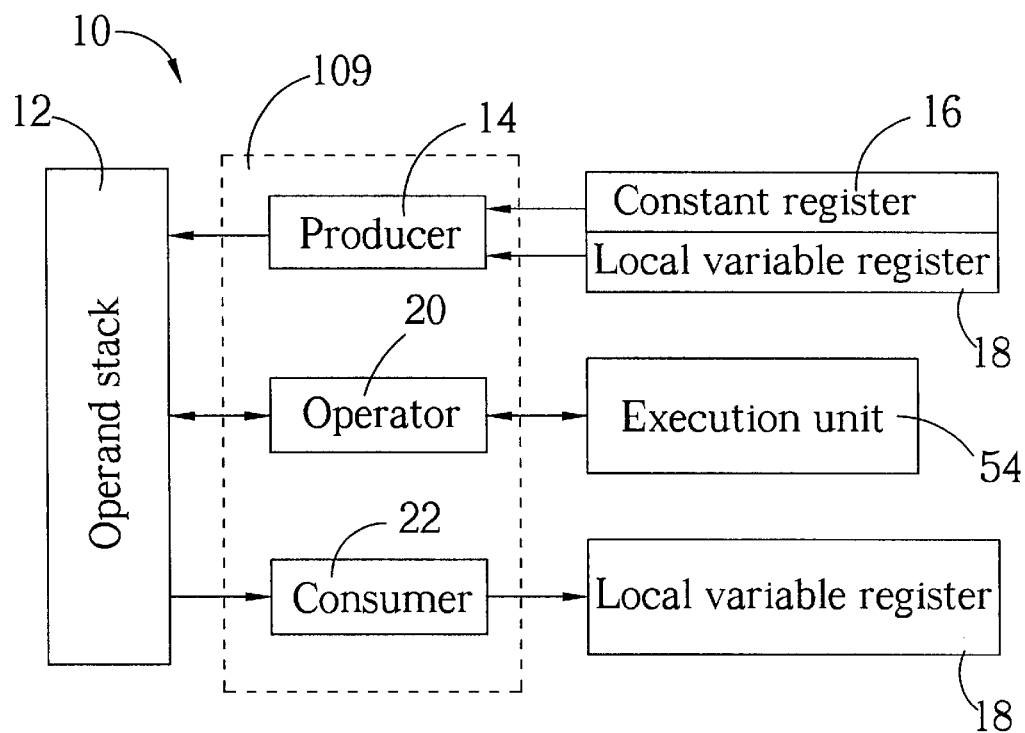
FIG. 2 is an operation flow of the stack machine in FIG. 1.

In contrast to FIG. 2, the operation performed in FIG. 8 is reduced to three steps from five steps thus greatly enhancing computational efficiency of the stack machine 40.

Figure 9:
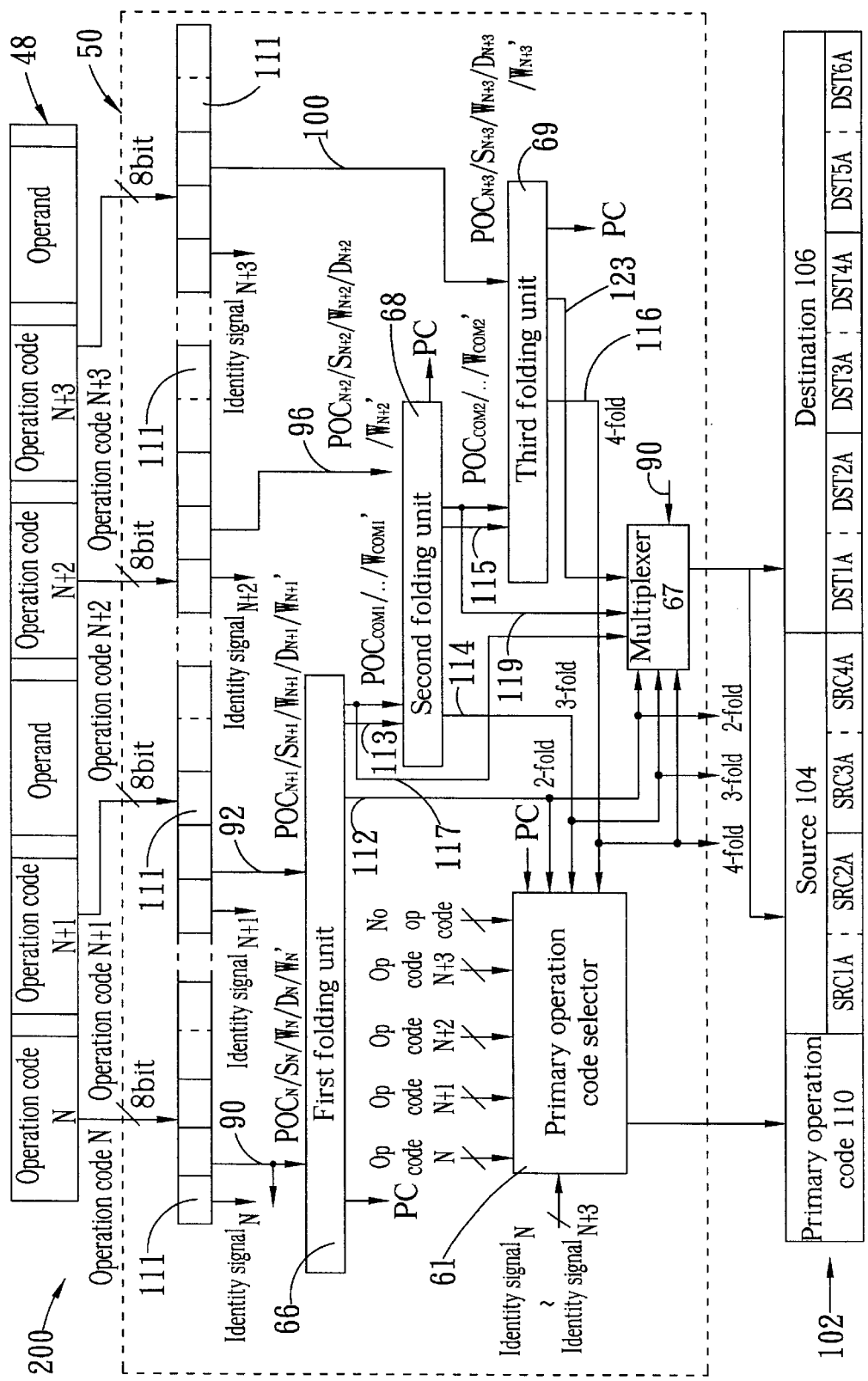
FIG. 9 is a block diagram of the operation folder in FIG. 3.

Please refer to FIG. 9. FIG. 9 is a block diagram of the operation folder 50. The operation folder 50 comprises four attribute memories 111, a first folding unit 66, a second folding unit 68, a third folding unit 69, a multiplexer 67 and a primary operation code selector 61.

When the folding instruction buffer 48 transmits operation codes of four instructions N, N+1, N+2, N+3 to the attribute memories 111, the attribute memories 111 will transform each of the operation codes into its corresponding POC type ($POC_N$~$POC_{N+3}$), source ($S_N$~$S_{N+3}$), source data length ($W_N$~$W_{N+3}$), destination ($D_N$~$D_{N+3}$), and destination data length ($W_{N'}$~$W_{N+3'}$), and output the operation codes through ports 90, 92, 96 and 100. Moreover, an identity signal corresponding to each operation code will be outputted to the primary operation code selector 61 for determining a primary operation code 110 of a folded instruction. POC type is used for identifying attribute of each instruction. The identity signal corresponding to each operation code is determined according to the POC type of the operation code such as 1 for operator and 0 for producer and consumer.

A folding operation is to be performed on the instructions N, N+1, N+2, N+3. Assuming the destination and destination data length of a preceding instruction are the same as the source and source data length of a following instruction, the steps of folding the four instructions N, N+1, N+2, N+3 are as follows:

Step 1: folding operation of the instructions N, N+1:

The first folding unit 66 first receives the instruction N from port 90 and instruction N+1 from port 92, and checks foldability of the two instructions N, N+1 according to the POC types of the two instructions according to the POC folding rule. If the two instructions N, N+1 are not foldable, the attribute memory 111 will transmit the source Sn and destination Dn of the instruction N to the multiplexer 67.

If the two instructions N, N+1 can be accumulated but are not foldable such as when the two instructions N, N+1 are both producers, the first folding unit 66 will generate a continue signal at port 113 and a temporary instruction $POC_{COM1}/S_{COM1}/W_{COM1}/D_{COM1}/W_{COM1}'$ but will not generate a folding number signal 101 such as a 2-fold signal. If the POC types of the instructions N, N+1, N+2 are P, P, O, the first folding unit 66 will accumulate the two instructions N, N+1 to generate a temporary instruction $POC_{COM1}/S_{COM1}/W_{COM1}/D_{COM1}/W_{COM1}'$. If the temporary instruction $POC_{COM1}/S_{COM1}/W_{COM1}/D_{COM1}/W_{COM1}'$ can be folded with the following instruction N+2, the second folding unit 68 will generate a 3-fold signal at port 114. If the instruction N+2 can not be folded with the temporary instruction $POC_{COM1}/S_{COM1}/W_{COM1}/D_{COM1}/W_{COM1}'$, the attribute memory 111 will transmit the source Sn and destination Dn of the instruction N to the multiplexer 67, and the first and second folding units 66, 68 will generate neither a 2-fold nor a 3-fold signal.

If the two instructions N, N+1 are foldable, the first folding unit 66 will generate a 2-fold signal at port 112, and transmit a generated temporary instruction $POC_{COM1}/S_{COM1}/W_{COM1}/D_{COM1}/W_{COM1}'$ to the second folding unit 68. Moreover, the first folding unit 66 will generate a continue signal at port 113 according to the POC folding rule.

Step 2: folding operation of the temporary instruction $POC_{COM1}/S_{COM1}/W_{COM1}/D_{COM1}/W_{COM1}'$ and the instruction N+2:

When the second folding unit 68 receives a continue signal at the port 113, it will perform the folding operation on the temporary instruction $POC_{COM1}/S_{COM1}/W_{COM1}/D_{COM1}/W_{COM1}'$ and the instruction $POC_{N+2}/S_{N+2}/W_{N+2}/D_{N+2}/W_{N+2'}$ transmitted from the port 96.

If the temporary instruction can not be folded with the instruction N+2 but the instruction N and N+1 are foldable, the first folding unit 66 will transmit the source $S_{COM1}$ and destination DCOM1 of the temporary instruction $POC_{COM1}/S_{COM1}/W_{COM1}/D_{COM1}/W_{COM1}'$ to the multiplexer 67.

If the temporary instruction can be folded or accumulated with the instruction N+2, the second folding unit 68 will generate another temporary instruction $POC_{COM2}/S_{COM2}/W_{COM2}/D_{COM2}/W_{COM2'}$ and transmit the instruction to the third folding unit 69, and generate a continue signal at port 115 according to the POC folding rule. If the instructions N, N+1, N+2 are foldable, the second folding unit 68 will generate a 3-fold signal at port 114. If the instructions N, N+1, N+2 are producers and are accumulated, the second folding unit 68 will not generate the 3-fold signal but further foldability check of the accumulated instruction $POC_{COM2}/S_{COM2}/W_{COM2}/D_{COM2}/W_{COM2'}$ with the following instruction N+3 has to be performed.

Step 3: folding operation of the temporary instruction $POC_{COM2}/S_{COM2}/W_{COM2}/D_{COM2}/W_{COM2'}$ and the instruction N+3:

When the third folding unit 69 receives the continue signal at the port 115, it will check the foldability of the temporary instruction $POC_{COM2}/S_{COM2}/W_{COM2}/D_{COM2}/W_{COM2'}$ and the following instruction N+3 transmitted from the port 100.

If the temporary instruction $POC_{COM2}/S_{COM2}/W_{COM2}/D_{COM2}/W_{COM2'}$ and the instruction N+3 are not foldable but preceding instructions are folded in the second folding unit 68, the second folding unit 68 will transmit the source $POC_{COM2}$ and destination $D_{COM2}$ of the temporary instruction $POC_{COM2}/S_{COM2}/W_{COM2}/D_{COM2}/W_{COM2'}$ to the multiplexer 67.

If the temporary instruction $POC_{COM2}/S_{COM2}/W_{COM2}/D_{COM2}/W_{COM2'}$ and the instruction N+3 are foldable, the third folding unit 69 will generate a last temporary instruction $POC_{COM3}/S_{COM3}/W_{COM3}/D_{COM3}/W_{COM3'}$ and a 4-fold signal at port 116, and transmit the source $S_{COM3}$ and destination $D_{COM3}$ of the temporary instruction $POC_{COM3}/S_{COM3}/W_{COM3}/D_{COM3}/W_{COM3'}$ to the multiplexer 67 through port 123.

In the mentioned steps, if a preceding instruction or a preceding temporary instruction is a producer, and a following instruction is a consumer, the folding unit 66, 68, or 69 will output a PC signal to the primary operation code selector 61.

The multiplexer 67 selects the source and destination according to the folding number signal 101 (112, 114, 116) outputted by each folding unit 66, 68, 69, and transmits the source and destination to the folded instruction buffer 102. The folding number signal 101 is a signal generated at the port 112, 114 or 116 such as a no-fold signal, 2-fold signal, 3-fold signal, or 4-fold signal.

Figure 10:
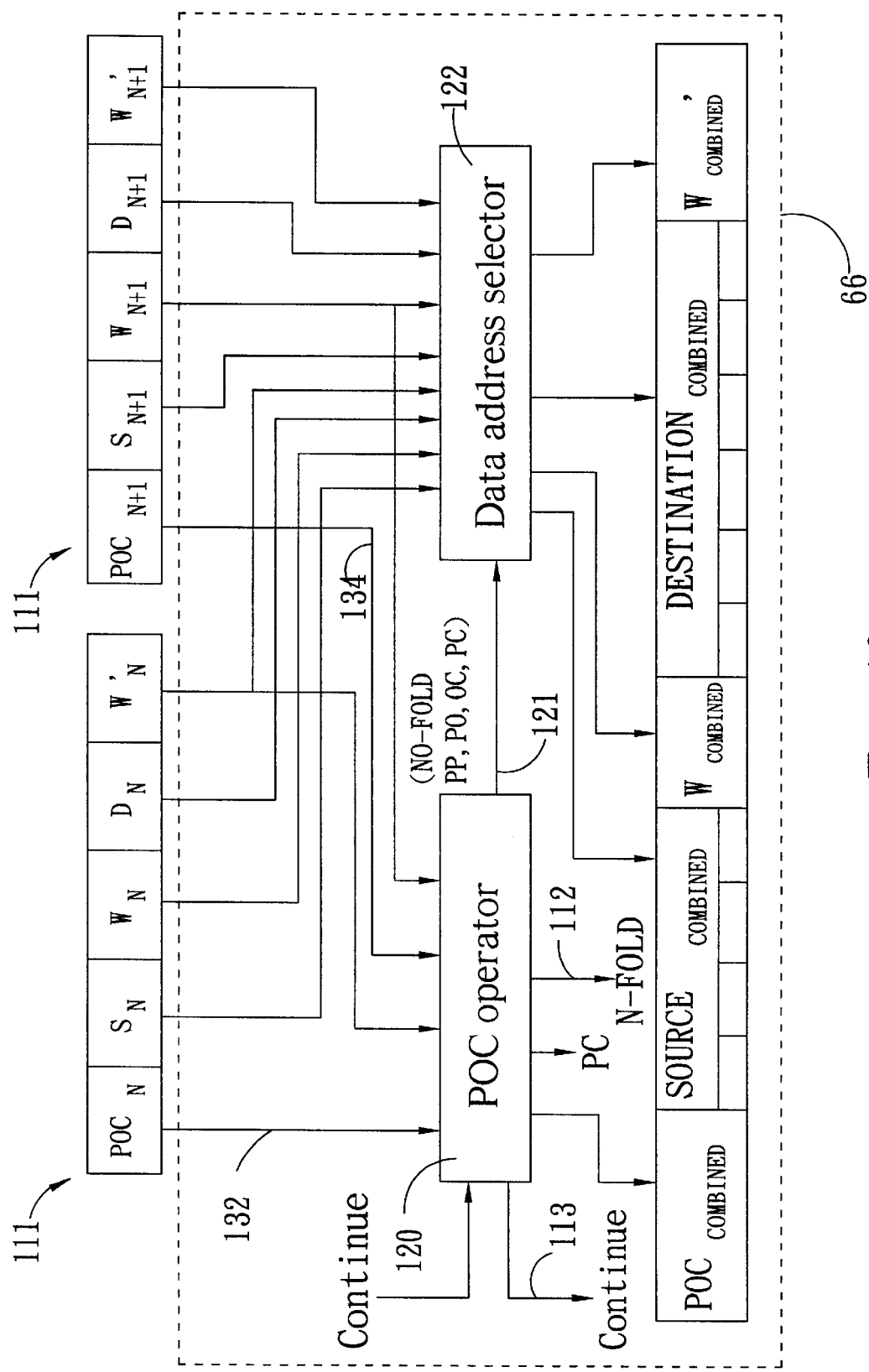
FIG. 10 is a block diagram of the folding unit in FIG. 9.

Please refer to FIG. 10. FIG. 10 is a block diagram of a folding unit 66. The folding unit 66(first) comprises a POC operator 120 and a data address selector 122.

The POC operator 120 is used for comparing the destination $D_N$ and length $W_{N'}$ transmitted from the port 90 with the source $S_{N+1}$ and length $W_{N+1}$ transmitted from the port 92. If $D_N=S_{N+1}$ and $W_{N'}=W_{N+1}$, the POC operator 120 will generate a POC type for a folded temporary instruction from the POC types transmitted from the ports 90 and 92. If $POC_N=P$ and $POC_{N+1} \neq O_T$, the POC type of the temporary instruction is $POC_{N+1}$. If $POC_N=O$ or $C$, the POC type of the temporary instruction is POCN. If the two instructions N, N+1 are foldable, the POC operator 120 will generate a 2-fold signal at port 112. Moreover, the POC operator 120 will generate a continue signal at port 113 according to the POC folding rule, and output a folding type signal such as NO_FOLD, PP, PO, OC, PC at port 121 to the data address selector 122. If the preceding instruction N is a producer and the following instruction N+1 is a consumer, the POC operator 120 will further output a PC signal.

The data address selector 122 receives the sources, source data lengths, destinations and destination data lengths of two consecutive instructions N, N+1 from the ports 90 and 92, and the folding type (NO_FOLD, PP, PO, OC, PC) from the POC operator 120 to generate the combined source, source data length, destination and destination data length according to following position storage rule:

NO_FOLD:(the two instructions N, N+1 are not foldable)
$S_{COMBINED}[1] \sim S_{COMBINED}[W_N] = S_N[1] \sim S_N[W_N]$
$D_{COMBINED}[1] \sim D_{COMBINED}[W_{N'}] = STK[TOS] \sim STK[TOS+W N']$
$W_{COMBINED}=W_N; W_{COMBINED'}=W_{N'}$ PP:(both instructions are producers)
$S_{COMBINED}[WN+1] \sim S_{COMBINED}[W_{N+WN+1}] = S_{N+1}[1] \sim S_{N+1}[W_{N+1}]$
$D_{COMBINED}[W_{N'}+1] \sim D_{COMBINED}[W_{N'}+W_{N+1}] = STK[TOS+W_{N'}] \sim STK[TOS+W_{N'}+W_{N+1}]$
$W_{COMBINED}=W_N+W_{N+1}; W_{COMBINED'}=W_{N'}+W_{N+1}$ PO:(N is a producer; N+1 is an operator)
$S_{COMBINED}[1] \sim S_{COMBINED}[W_N] = S_N[1] \sim S_N[W_N]$
$D_{COMBINED}[1] \sim D_{COMBINED}[W_{N+1}'] = D_{N+1}[1] \sim D_{N+1}[W_{N+1}']$
$W_{COMBINED}=W_N; W_{COMBINED'}=W_{N+1'}$ OC:(N is an operator; N+1 is a consumer)
$S_{COMBINED}[1] \sim S_{COMBINED}[W_N] = S_N[1] \sim S_N[W_N]$
$D_{COMBINED}[1] \sim D_{COMBINED}[W_{N'}] = D_{N+1}[1] \sim D_{N+1}[W_{N+1}']$
$W_{COMBINED}=W_N; W_{COMBINED'}=W_{N+1'}$ PC:(N is a producer; N+1 is a consumer)
$S_{COMBINED}[1] \sim S_{COMBINED}[W_N] = S_N[1] \sim S_N[W_N]$
$D_{COMBINED}[1] \sim D_{COMBINED}[W_{N+1}'] = D_{N+1}[1] \sim D_{N+1}[W_{N+1}']$
$W_{COMBINED}=W_N; W_{COMBINED'}=W_{N+1'}$ wherein
$S_{COMBINED}$ is the source of the folded instruction;
$D_{COMBINED}$ is the destination of the folded instruction;
$W_{COMBINED}$ is the source data length of the folded instruction;
$W_{COMBINED'}$ is the destination data length of the folded instruction;
$W_N$ is the source data length of the instruction N;
$W_{N'}$ is the destination data length of the instruction N;
$W_{N+1}$ is the source data length of the instruction N+1;
$W_{N+1'}$ is the destination data length of the instruction N+1;
STK is the operand stack 12; and
TOS is the top of the operand stack 12.

For example, $S_{COMBINED}[1] \sim S_{COMBINED}[W_N]=S_N[1] \sim S_N[W_N]$ means that:

The source address of the source $S_{COMBINED}$ of the folded instruction is between 1 to $W_N$ which is the same as the source address of the source $S_N$ of the instruction N.

TABLE 2

| | | P | O | | | C |
|---|---|---|---|---|---|---|
| Type | Symbol | Bit 3 | Bit 2 | Bit 1 | Bit 0 |
| Producer | P | 1 | 0 | 0 | 0 |
| Operator | $O_E$ | 0 | 1 | 0 | 0 |
| | $O_B$ | 0 | 0 | 1 | 0 |
| | $O_C$ | 0 | 1 | 1 | 0 |
| | $O_T$ | 0 | 0 | 0 | 0 |
| Consumer | C | 0 | 0 | 0 | 1 |

Figure 11:
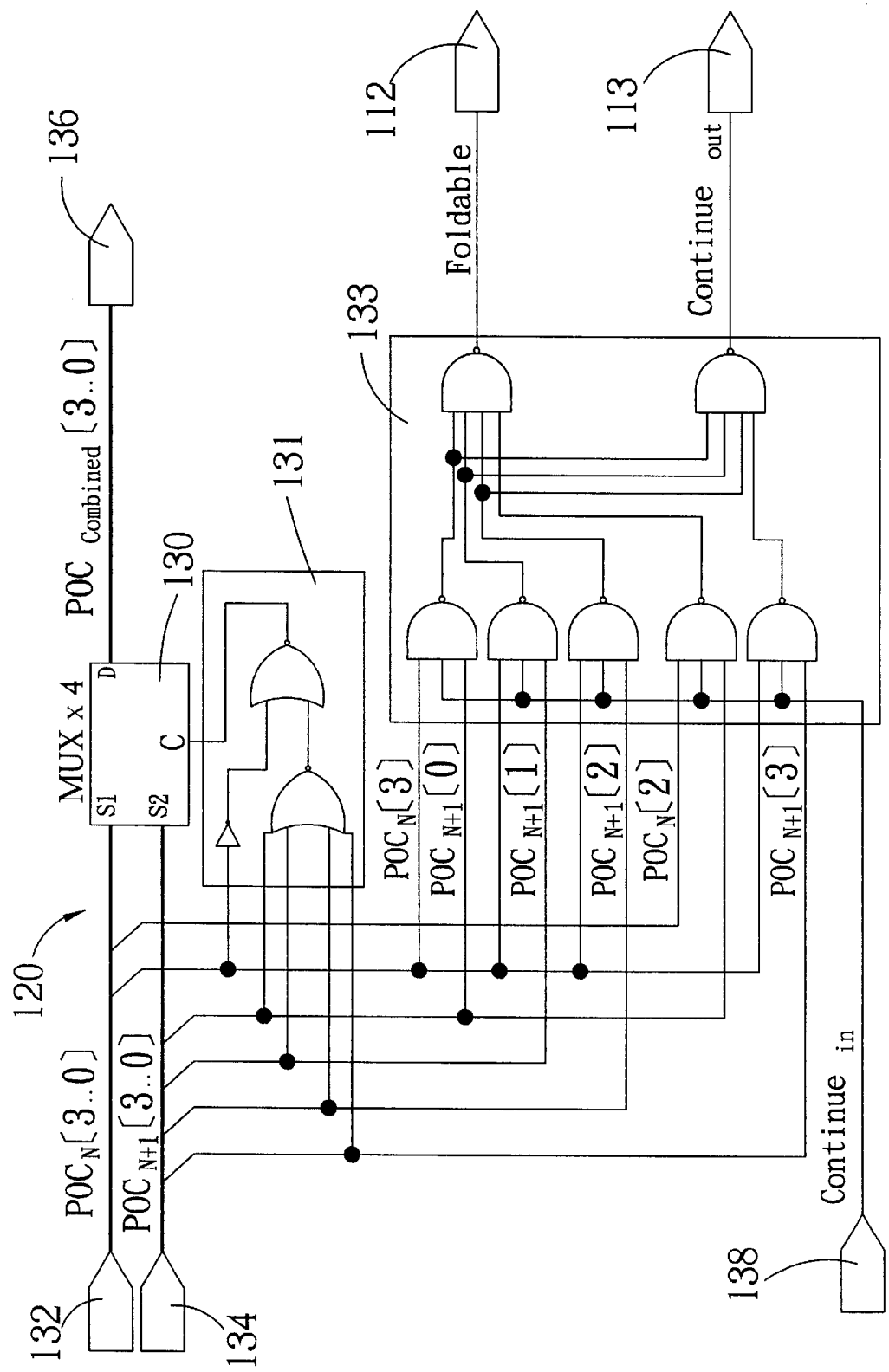
FIG. 11 shows a portion of a logic circuit diagram of the POC operator in FIG. 10.

Please refer to FIG. 11 and Table 2. FIG. 11 shows a portion of a logic circuit diagram of the POC operator 120. Table 2 is a binary representation of the POC types. The POC operator 120 comprises a selecting circuit 131, a multiplexer 130 and an identification circuit 133. Each of the POC types comprises 4 bits where O ($O_E$, $O_B$, $O_C$, $O_T$) type is identified by using bit 2 and bit 1.

The selecting circuit 131 is used for selecting a POC type of a combined instruction according to POC types of instructions N and N+1. When $POC_N=P$ and $POC_{N+1} \neq O_T$, the POC type of the combined instruction is $POC_{N+1}$. When $POC_N=O$ or C, the POC type of the combined instruction is $POC_N$. The multiplexer 130 outputs one of the $POC_N$ and $POC_{N+1}$ inputted at port 132 and 134 at port 136 according to the selection of the selecting circuit 131. The identification circuit 133 generates a folding number signal 101 at port 112 and a continue signal at port 113 according to the binary representation of each POC type, the POC folding rule, and a continue signal generated by a preceding folding unit.

The folding number signal 101 at port 112 and the continue signal at port 113 are generated according to the following operations:

the folding number signal=$(POC_N[3]\cdot(POC_{N+1}[1]+POC_{N+1}[2])+POC_{N+1}[0]\cdot(POC_N[3]+POC_N[2]))\cdot continue_{in}$ the continue signal=$(POC_N[3]\cdot(POC_{N+1}[3]+POC_{N+1}[2]+POC_{N+1}[1])+POC_{N+1}[0]\cdot POC_N[2])\cdot continue_{in}$ wherein $POC_N$ represents the POC type of a preceding instruction, $POC_{N+1}$ represents the POC type of a following instruction, each number inside a square bracket represents the bit number of a corresponding POC type such as [3] represents bit 3.

Figure 12:
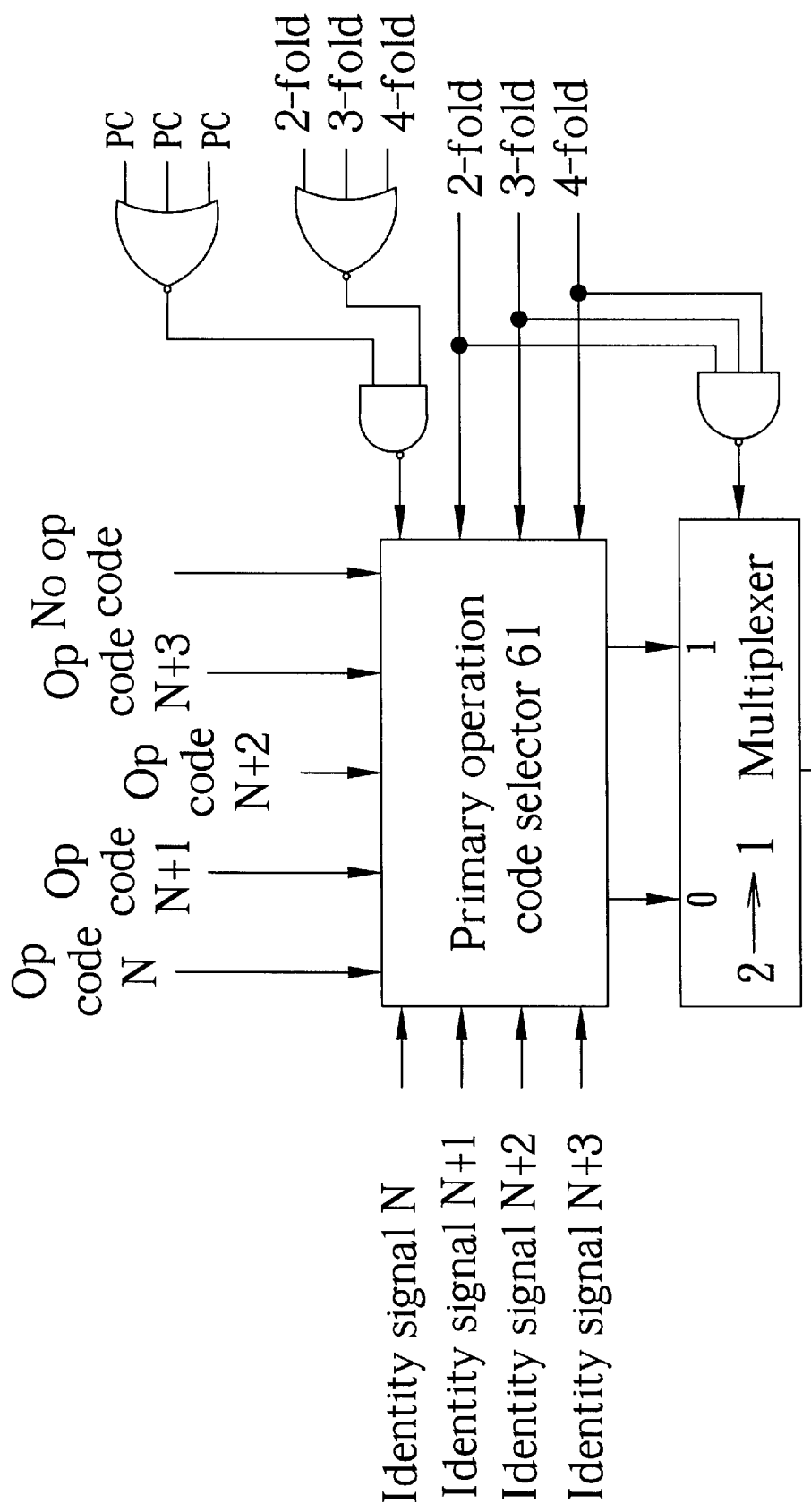
FIG. 12 is a logic circuit diagram of the primary operation code selector in FIG. 9.

For example, if the POC types of two consecutive instructions are P and $O_E$, their binary representation will be [1,0,0,0] and [0,1,0,0]. If the continue signal ($continue_{in}$) at port 138 has a value 1, logic operations of the folding number signal and the continue signal will be:

the folding number signal=$(POC_N[3]\cdot(POC_{N+1}[1]+POC_{N+1}[2])+POC_{N+1}[0]\cdot(POC_N[3]+POC_N[2]))\cdot continue_{in}=(1\cdot(0+1)+0\cdot(1+0))\cdot 1=1$ the continue signal=$(POC_N[3]\cdot(POC_{N+1}[3]+POC_{N+1}[2]+POC_{N+1}[1])+POC_{N+1}[0]\cdot POC_N[2])\cdot continue_{in}=(1\cdot(0+1+0)+0\cdot 0)\cdot 1=1$ Please refer to FIG. 12. FIG. 12 is a logic circuit diagram of the primary operation code selector 61 in FIG. 9. The primary operation code selector 61 selects a primary operation code or a no operation code signal according the folding number signals 101 and the PC signal transmitted from the folding units 66, 68, 69, and the identity signals transmitted from the attribute memories 111. For example, if POC types of four foldable instructions (N, N+1, N+2, N+3) are P, P, O, C, and the identity signals of P, O and C are defined as 0, 1, 0, the operation code of the instruction N+2 will be outputted to the folded instruction buffer 102 to be a primary operation code 110 according to a 4-fold signal and identity signals (0, 0, 1, 0).

If two consecutive foldable instructions are a producer (P) and a consumer (C), the primary operation code selector 61 will receive a PC signal and will select a no operation code signal because no operation has to be performed in this folding. The combined instruction will have a source of the producer and will have a destination of the consumer.

Compared with the related art stack machine 10, the stack machine 40 according to the present invention can efficiently fold a plurality of instructions for enhancing operation efficiency of the stack machine 40.

The instruction folding method used in the stack machine 40 can be illustrated by folding four consecutive instructions as follows:

(a) accessing and storing a plurality of instructions by using the instruction cache 41;

(b) accessing and storing four of the instructions N, N+1, N+2, N+3 by using the instruction ring buffer (c) transforming the instructions in the instruction ring buffer 42 into operation codes and operands corresponding to the instructions by using the operation code checker 44;

(d) storing the operation codes, operands and indicators of the four instructions N, N+1, N+2, N+3 transmitted from the operation code checker 44, and transmitting the operation codes to the attribute memories 111 by using the folding instruction buffer 48;

(e) transforming each of the operation codes into its corresponding POC type ($POC_N \sim POC_{N+3}$), source ($S_N \sim S_{N+3}$), source data length ($W_N \sim W_{N+3}$), destination ($D_N \sim D_{N+3}$), destination data length ($W_{N'} \sim W_{N+3'}$), and outputting them through port 90, 92, 96 and 100 by using the attribute memories 111;

(f) folding the instructions N, N+1, N+2, N+3 by using the folding units 66, 68, 69 according to the POC folding rule;

(g) transmitting a source and destination of an unfoldable or a folded instruction to the multiplexer 67 through port 90, 117, 119 or 123 by using a first attribute memory 111 or one of the folding units 66, 68, 69, and transmitting a folding number signal 101 to the primary operation code selector 61 and the folding length checker 64 through port 112, 114, 116 by using one of the folding units 66, 68, 69 wherein if two consecutive instructions are a combination of PC (producer-consumer), the folding unit 66, 68, 69 will transmit a PC signal to the primary operation code selector 61;

(h) storing the source 104 and destination 106 of the unfoldable or folded instruction in the temporary folded instruction buffer 102 by using the multiplexer 67;

(i) receiving indicators of the instructions N, N+1, N+2, N+3 in the folding instruction buffer 48 and checking the number of foldable bytes by using the folding length checker 64 according to the folding number signal 101 generated by the folding unit 66, 68, 69 so that the program controller 60 can control access or shift of the instructions stored in the instruction cache 41 or the instruction ring buffer 42;

(j) selecting a primary operation code 110 or a no operation code signal according to the folding number signals 101 and the PC signal transmitted from the folding units 66, 68, 69 and the identity signals transmitted from the attribute memories 111, and storing the primary operation code 110 into the temporary folded instruction buffer 102 by using the primary operation code selector 61;

(k) receiving the source 104 from the temporary folded instruction buffer 102 and a base address corresponding to the source 104 by using the source address generation unit 56 wherein if the instructions contain operands 1022 corresponding to their operation codes, the operands 1022 corresponding to the source 104 will be combined to form a source address 105, and the source address 105 will be stored into the executable instruction buffer 58;

(l) receiving the destination 106 from the temporary folded instruction buffer 102 and a base address corresponding to the destination 106 by using the destination address generation unit 57 wherein if the instructions contain operands 1022 corresponding to their operation codes, operands 1022 corresponding to the destination 106 will be combined to form a destination address 107, and the destination address 107 will be stored into the executable instruction buffer 58;

(m) decoding the primary operation code 110 according to its instruction format and outputting a control signal 109 to the executable instruction buffer 58 by using the decoder 52;

(n) receiving the control signal 109, source address 105 and destination address 107 from the executable instruction buffer 58, and accessing data according to the source address 105 and destination address 107 through the local variable register 18, the operand stack 12 or constant register 16 by using the execution unit 54 so as to execute the control signal 109.

The instruction folding method can be used to fold instructions in many stack machines such as Java Virtual Machine (JVM) produced by Sun Microelectronic Corporation. The JVM is widely used in network computers. The Java bytecodes play an important role in Java Virtual Machine wherein about 230 of these bytecodes can be categorized into 17 instruction types. The number of execution cycles and percentage of occurrences of these instruction types can be summarized as shown in Table 3.

TABLE 3

| Instruction type | Number of execution cycles | Percentage of occurrences |
| --- | --- | --- |
| Load local var. to stack | 1 | 38.02 |
| Push constant to stack | 1 | 7.07 |
| Store stack data to local variable | 1 | 6.96 |
| Wide operations | 1 | 0.05 |
| Stack management | 1 | 1.87 |
| Arithmetic operations | 1 | 6.78 |
| Logical operations | 1 | 1.74 |
| Conversion operations | 1 | 0.97 |
| Managing arrays | 5 | 5.45 |
| Function return | 5 | 3.83 |
| Table jumping | 10 | 1.32 |
| Manipulating object field | 5 | 0.10 |
| Method invocation | 20 | 0.10 |
| Transfer control | 1 | 9.11 |
| Miscellaneous and monitors | 5 | 0.05 |
| Quick operations | 3 | 17.00 |
| Exception handling | N/A | 0.00 |

Please refer to Table 3. Table 3 shows the number of execution cycles and the percentage of occurrences of each of the instruction types. It shows that 38.02% of instructions are loading data from the local variable register 18 to the operand stack 12 and 7.07% of instructions are loading data from the constant register 16 to the operand stack 12, therefore, 45.09% of instructions are P-type instructions. Moreover, 6.96% of instructions are C-type instructions which move data from the operand stack 12 to the local variable register 18. The P and C-type instructions make up 52.05% of instructions, and the rest of the instructions (O-type) only make up 47.95% of the instructions. Therefore, operations of the instructions can be greatly reduced when accesses of data through the operand stack 12 can be prevented.

The instruction folding method can first check and combine a plurality of instructions to avoid repeated accesses of data through the operand stack 12 to save operation time so that the operation efficiency of the stack machine 40 can be greatly enhanced.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. An apparatus for folding a plurality of instructions comprising:

a folding instruction buffer for storing operation codes and operands of a predetermined number of instructions to be folded;

an operation folder for receiving the operation codes of the instructions, and checking if two consecutive instructions are foldable according to a POC folding rule and a position storage rule by checking if a destination of a preceding instruction and a source of a following instruction are the same, and a destination data length of the preceding instruction and a source data length of the following instruction are the same wherein if the two consecutive instructions are not foldable, the operation folder will output the operation code, source and destination of the preceding instruction, if the two consecutive instructions are foldable, the operation folder will check POC types of the two instructions according to the POC folding rule so as to generate a folding number signal, the operation folder will also generate a source and a destination of a combined temporary command according to the position storage rule, and select a primary operation code according to the POC types of the instructions and the folding number signal;

a folding length checker for receiving indicators which identify the operation codes and operands corresponding to the instructions in the instruction buffer, and checking the folding number signal transmitted from the operation folder for the number of foldable instructions;

a temporary folded instruction buffer for receiving a source, a destination, operands corresponding to the operation codes, and a primary operation code of a folded instruction from the operation folder;

a source address generation unit for receiving the source from the temporary folded instruction buffer and a base address corresponding to the source wherein if the instructions contain operands corresponding to their operation codes, operands corresponding to the source will be combined to form a source address; and a destination address generation unit for receiving the destination from the temporary folded instruction buffer and a base address corresponding to the destination wherein if the instructions contain operands corresponding to their operation codes, operands corresponding to the destination will be combined to form a destination address.

2. The apparatus of claim 1 wherein the operation folder further comprises:

an attribute memory for receiving an operation code of each instruction in the folding instruction buffer, and transforming the operation code into its corresponding POC type, source, source data length, destination, destination data length and identity signal;

at least one folding unit for receiving POC types, sources, source data lengths, destinations and destination data lengths of two consecutive instructions from the attribute memory, checking if the POC types of the consecutive instructions are foldable according to the POC folding rule and the position storage rule wherein if the instructions are not foldable, maintain the source, source data length, destination and destination data length of the preceding instruction, if the two instructions are foldable, combine the two instructions to form a temporary instruction comprising a combined POC type, source, source data length, destination, destination data length, generate a folding number signal for indicating the number of foldings, and generate a continue signal when the temporary instruction can be checked for further foldings;

a primary operation code selector for receiving identity signals from the attribute memory and the folding number signal from the folding unit, and selecting a primary operation code for a folded instruction according to the identity signals; and a multiplexer for selecting a source and destination of the folded instruction according to the folding number signal generated by the folding unit.

3. The apparatus of claim 2 wherein the folding units are connected in a cascade manner, each of the folding units can check the foldability of a preceding instruction and a following instruction according to the POC folding rule and the position storage rule.

4. The apparatus of claim 3 wherein each of the folding units further comprises:

a POC operator for checking POC types of a preceding instruction and a following instruction according to the POC folding rule and generating the folding number signal, the continue signal and a folding type signal; and a data address selector for checking if the preceding and following instructions are foldable according to the position storage rule and the folding type signal transmitted from the POC operator wherein if they are foldable, the data address selector will output source, source data length, destination and destination data length of a combined temporary instruction, if they are not foldable, the data address selector will output source, source data length, destination and destination data length of the preceding instruction.

5. The apparatus of claim 4 wherein the POC operator further comprises:

a selecting circuit for selecting the POC type of the temporary instruction from the POC types of the preceding and following instructions according to the POC folding rule;

a multiplexer for generating the POC type of the temporary instruction according to an output of the selecting circuit; and an identification circuit for generating the folding number signal and the continue signal according to the POC types of the preceding and following instructions and a continue signal transmitted from the preceding folding unit.

6. The apparatus of claim 2 wherein each of the folding units further comprises:

a POC operator for checking POC types of a preceding instruction and a following instruction according to the POC folding rule and generating the folding number signal, the continue signal and a folding type signal; and a data address selector for checking if the preceding and following instructions are foldable according to the position storage rule and the folding type signal transmitted from the POC operator wherein if they are foldable, the data address selector will output source, source data length, destination and destination data length of a combined temporary instruction, if they are not foldable, the data address selector will output source, source data length, destination and destination data length of the preceding instruction.

7. The apparatus of claim 6 wherein the POC operator further comprises:

a selecting circuit for selecting the POC type of the temporary instruction from the POC types of the preceding and following instructions according to the POC folding rule;

a multiplexer for generating the POC type of the temporary instruction according to an output of the selecting circuit; and an identification circuit for generating the folding number signal and the continue signal according to the POC types of the preceding and following instructions and a continue signal transmitted from the preceding folding unit.

8. An apparatus for folding a plurality of instructions in a stack machine comprising:

an instruction cache for accessing and storing a plurality of instructions;

an instruction ring buffer for accessing and storing a predetermined number of the instructions;

an operation code checker for finding positions of operation codes and operands corresponding to the instructions and finding indicators which identify the operation codes and operands;

a program controller for controlling access or shift of the instructions stored in the instruction cache and the instruction ring buffer according to the indicators of the instructions in the operation code checker;

an operation folding device for receiving the operation codes and operands from the operation code checker, and checking if a preceding instruction and a following instruction are foldable according to a POC folding rule and a position storage rule by checking if a destination of the preceding instruction and a source of the following instruction are the same, and a destination data length of the preceding instruction and a source data length of the following instruction are the same so as to generate a source address, a destination address and a primary operation code of a generated instruction;

a decoder for decoding the primary operation code according to its instruction format, and outputting a control signal accordingly;

an executable instruction buffer for storing the source address, the destination address, and the control signal of the generated instruction; and an execution unit for receiving the control signal, source address and destination address from the executable instruction buffer, and executing the control signal according to the source and destination addresses.

9. A method for folding a plurality of instructions, the method comprising the steps of:

storing operation codes and operands of a predetermined number of instructions to be folded;

receiving the operation codes of the instructions, and checking if two consecutive instructions are foldable according to a POC folding rule and a position storage rule by checking if a destination of a preceding instruction and a source of a following instruction are the same, and a destination data length of the preceding instruction and a source data length of the following instruction are the same wherein if the two consecutive instructions are not foldable, output the operation code, source and destination of the preceding instruction, if the two consecutive instructions are foldable, check POC types of the two instructions according to the POC folding rule so as to generate a folding number signal, and generate a source and a destination of a combined temporary command according to the position storage rule, and select a primary operation code according to the POC types of the instructions and the folding number signal;

receiving indicators which identify the operation codes and operands corresponding to the instructions, and checking the folding number signal for the number of foldable instructions;

receiving a source, a destination, operands corresponding to the operation codes, and a primary operation code of a folded instruction;

receiving the source and a base address corresponding to the source wherein if the instructions contain operands corresponding to their operation codes, operands corresponding to the source will be combined to form a source address; and receiving the destination and a base address corresponding to the destination wherein if the instructions contain operands corresponding to their operation codes, operands corresponding to the destination will be combined to form a destination address.

10. The method of claim 9 further comprising:

receiving an operation code of each instruction, and transforming the operation code into its corresponding POC type, source, source data length, destination, destination data length and identity signal;

receiving POC types, sources, source data lengths, destinations and destination data lengths of two consecutive instructions, checking if the POC types of the consecutive instructions are foldable according to the POC folding rule and the position storage rule wherein if the instructions are not foldable, maintain the source, source data length, destination and destination data length of the preceding instruction, if the two instructions are foldable, combine the two instructions to form a temporary instruction comprising a combined POC type, source, source data length, destination, destination data length, generate the folding number signal for indicating the number of foldings, and generate the continue signal when the temporary instruction can be checked for further foldings;

receiving identity signals and the folding number signal, and selecting a primary operation code for a folded instruction according to the identity signals; and selecting a source and destination of the folded instruction according to the folding number signal.

11. The method of claim 10 further comprising:

checking POC types of a preceding instruction and a following instruction according to the POC folding rule and generating the folding number signal, the continue signal and a folding type signal; and checking if the preceding and following instructions are foldable according to the position storage rule and the folding type signal wherein if they are foldable, output source, source data length, destination and destination data length of a combined temporary instruction, if they are not foldable, output source, source data length, destination and destination data length of the preceding instruction.

12. The method of claim 11 further comprising:

selecting the POC type of the temporary instruction from the POC types of the preceding and following instructions according to the POC folding rule;

generating the POC type of the temporary instruction; and generating the folding number signal and the continue signal according to the POC types of the preceding and following instructions and a continue signal received.

13. A method for folding a plurality of instructions in a stack machine, the method comprising the steps of:

accessing and storing a plurality of instructions;

accessing and storing a predetermined number of the instructions;

finding positions of operation codes and operands corresponding to the instructions and indicators which identify the operation codes and the operands;

controlling shifting of the instructions according to the indicators of the instructions;

receiving the operation codes and operands, and checking if a preceding instruction and a following instruction are foldable according to a POC folding rule and a position storage rule by checking if a destination of the preceding instruction and a source of the following instruction are the same, and a destination data length of the preceding instruction and a source data length of the following instruction are the same so as to generate a source address, a destination address and a primary operation code of a generated instruction;

decoding the primary operation code according to its instruction format, and outputting a control signal accordingly;

storing the source address, the destination address, and the control signal of the generated instruction; and receiving the control signal, source address and destination address, and executing the control signal according to the source and destination addresses.

* * * * *